United States Patent [19]

Opher et al.

[11] Patent Number: 5,345,558
[45] Date of Patent: Sep. 6, 1994

[54] TOPOLOGY INDEPENDENT BROADCAST OF CELLS IN AN ATM NETWORK OR THE LIKE

[75] Inventors: Ayal Opher, Mountain View; Dilip Chatwani; Rajan Subramanian, both of Newark, all of Calif.

[73] Assignee: SynOptics Communications, Inc., Santa Clara, Calif.

[21] Appl. No.: 980,253

[22] Filed: Nov. 23, 1992

[51] Int. Cl.$^5$ .............................................. G06F 13/00
[52] U.S. Cl. .................... 395/200; 370/94.1
[58] Field of Search ................... 395/200; 370/14, 54, 370/60, 61, 91, 94.1, 95.1, 105.1, 105.2, 94.2, 94.3

[56] References Cited

U.S. PATENT DOCUMENTS

| | | | |
|---|---|---|---|
| 4,545,013 | 12/1981 | Lyon et al. | 364/200 |
| 4,644,532 | 6/1985 | George et al. | 370/94 |
| 4,827,411 | 6/1987 | Arrowood et al. | 364/200 |
| 4,947,388 | 8/1990 | Kuwahara et al. | 370/60 |
| 5,012,466 | 4/1991 | Buhrke et al. | 370/62 |
| 5,049,873 | 5/1990 | Robins et al. | 340/825.06 |
| 5,084,867 | 1/1992 | Tachibana et al. | 370/60 |
| 5,101,348 | 6/1988 | Arrowood et al. | 395/200 |
| 5,119,367 | 6/1992 | Kawakatsu et al. | 370/54 |
| 5,119,369 | 6/1992 | Tanabe et al. | 370/60 |
| 5,140,588 | 8/1992 | Danner | 370/94.1 |
| 5,142,531 | 8/1992 | Kirby | 370/94.3 |
| 5,191,577 | 3/1993 | Uchida et al. | 370/60 |
| 5,224,099 | 6/1993 | Corbalis et al. | 370/94.2 |
| 5,229,991 | 7/1993 | Turner | 370/60 |

OTHER PUBLICATIONS

Ross Finlayson, "Bootstrap Loading Using TFTP", Networking Group Request for Comments: 906. Jun. 1984. pp. 1–4.

J. Postel, "User Datagram Protocal", RFC 768. Aug. 28, 1980. pp. 1–3.

K. R. Sollins, "The TFTP Protocol (Revision 2)", Network Working Group Request for Comments: 783. Jun. 1981. pp. 1–9.

W. Richard Stevens, "UNIX Network Programming", Health Systems International. 1990. pp. 466–472.

Martin de Prycker, "Asynchronous Transfer Mode: Solution for Broadband ISDN" 1991. pp. 55–124.

Rainer Handel and Manfred N. Huber, "Integrated Broadband Networks: An Introduction to ATM-Based Networks" 1991. pp. 84–91 and 113–136.

*Primary Examiner*—Dale M. Shaw
*Assistant Examiner*—Moustafa M. Meky
*Attorney, Agent, or Firm*—Blakely, Sokoloff, Taylor & Zafman

[57] ABSTRACT

A topology-independent method and apparatus for avoiding continuous looping of transmission of cells and for allowing broadcast of cells in a network implementing Asynchronous Transfer Mode ("ATM") or similar networking architectures. The disclosed method and apparatus provides for "misusing" fields in a cell header in order to provide for information identifying a cell as a broadcast cell and to provide for "expiration information" in the cell header. More specifically, a first station stores data in a first area of a cell intended for transmission on the network, where the first area is defined by standards to store certain information (in particular, it is defined in the preferred embodiment to store virtual path identifier information, VPI). The information stored identifies the cell as a broadcast cell. In other words, the field is "misused" to store this information. The first station further stores in a second field, also defined by the standard to store certain information (in particular, virtual channel identifier information, VCI), information which allows for expiration of the cell. Thus, this second field is also "misused". The cell is then transmitted onto the network, copied and forwarded out of multiple ports of each switch, until the cell "expires". In the described embodiment, the "expiration information" is implemented as a hop count.

39 Claims, 15 Drawing Sheets

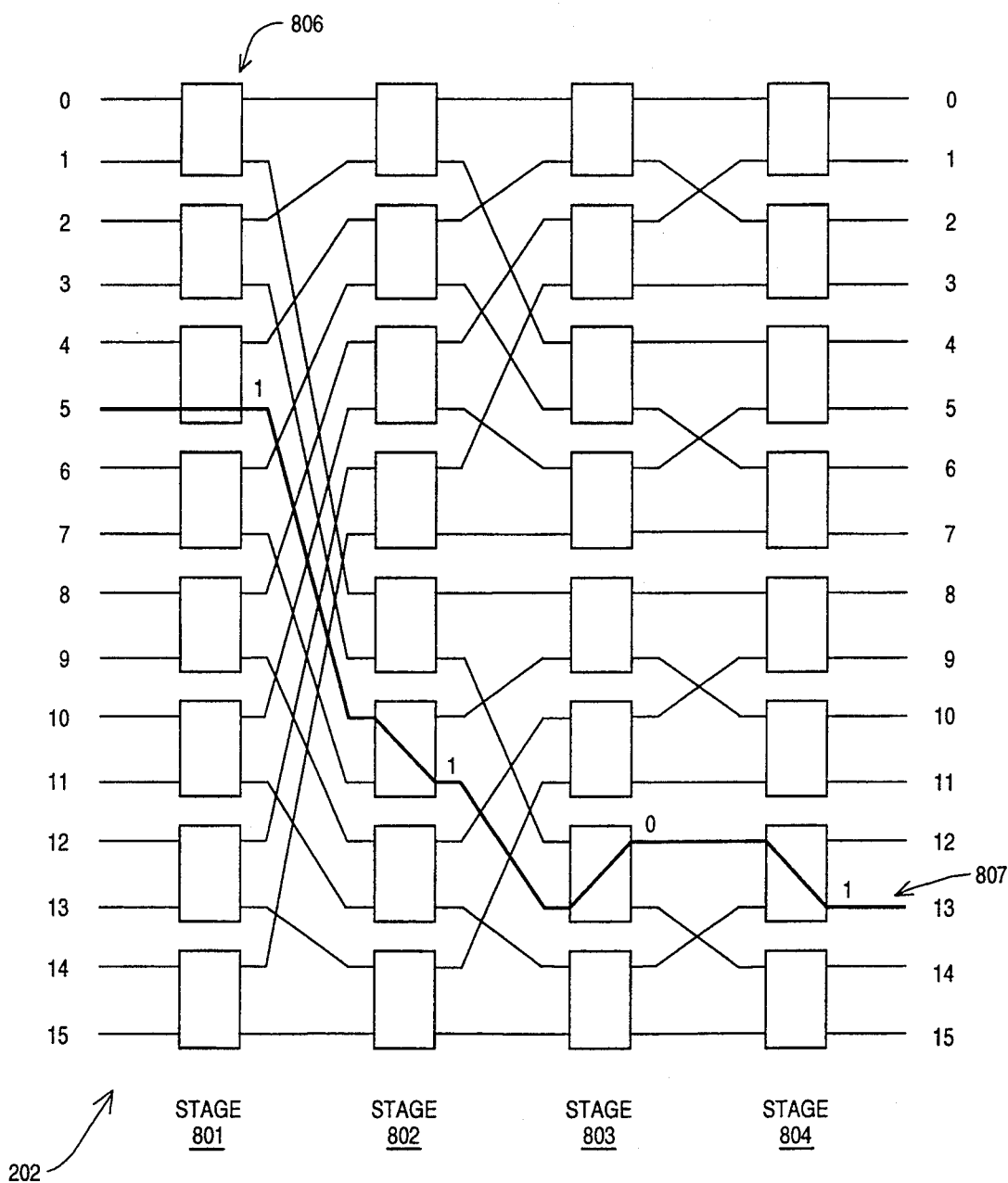

TOPOLOGY INDEPENDENT BROADCAST OF CELLS IN AN ATM NETWORK OR THE LIKE

BACKGROUND OF THE INVENTION

1. Field of the Invention

The present invention relates to the field of computer networking, specifically to the field of asynchronous transfer mode (ATM) communications. More specifically, the present invention relates to methods and apparatus for use in broadcast of cells in an ATM network.

2. Description of the Related Art

It may be worthwhile to briefly state that the present invention relates to the field of broadcast transmission of messages in an asynchronous transfer mode (ATM) network or the like. The present invention employs the concept of flooding in combination with use of hop count or similar scheme in order to effect broadcast of messages. Therefore, described below, as related art, is information on (1) ATM networks, (2) flooding of messages in networks, and (3) use of a hop count in network systems.

ATM Networks

The preferred embodiment of the present invention is implemented in an asynchronous transfer mode (ATM) network. Such networks are well-known in the art and, in fact, are described in various references. One such reference is Handel, R. and Huber, M. N., *Integrated Broadband Networks, an Introduction to ATM-based Networks*, published by Addison-Wesley Publishing Company, 1991 and hereinafter referred to as the Handel et al. reference. Another such reference is de Prycher, M., *Asynchronous Transfer Mode solution for broadband ISDN*, published by Ellis Horwood Limited, West Sussex, England, 1991.

Importantly, in ATM networks information is communicated in cells which comprise a well-defined and size-limited header area and a user information area. The switch fabric of an ATM switch is designed to act upon information in the header area in order to provide for routing of cells in the network. The switch fabric is normally implemented in hardware, for example using large-scale integrated circuits, in order to provide for high-speed switching of cells in the network. It is important to an understanding of the present invention to realize that if it was necessary to delay transmission of a cell through the switch fabric such as by accepting the cell into a memory so that a software program could examine and manipulate portions of the data in the cell, undesirable delays would result in cell transmission.

In addition, standards have been adopted for ATM networks, for example, by the International Telegraph and Telephone Consultative Committee (CCITT). The CCITT standards require a header area comprising a fixed set of fields and being of a fixed size and a payload area, also referred to as a user information area, and also of a fixed size but allowing user-defined information fields. Importantly, the CCITT standards define the header to be of a very limited size to keep at a minimum overhead associated with each cell. The standards do not allow fields to be added to the header area.

ATM Cell Format

In an ATM network, all information to be transferred is packed into fixed-size slots which are commonly referred to as cells. Of come, such fixed-size slots may be referred to with other terminology, for example, packets. In one standard ATM format (CCITT Recommendation I. 150, "B-ISDN ATM Functional Characteristics", Geneva, 1991), the format is generally shown in FIG. 1(*a*) and includes a 5-byte (also called octet) header field 101 and a 48-byte information field 102. The information field is defined by the standard to be available to the user and the header field is defined by the standard to carry information pertaining to ATM functionality, in particular, information for identification of the cells by means of a label. See, Handel et al., at pages 14–17.

The standardized format for the header field 101 is better shown in FIG. 1(*b*) and 1(*c*) and is described in greater detail with reference to Handel et al., at pages 84–91. The header field 101 will be discussed in greater detail below; however, it is worthwhile mentioning here that the header field 101 comprises two fields: (1) a virtual channel identifier (VCI) and (2) a virtual path identifier (VPI). The VPI field is deemed as an eight-bit field in one format (see FIG. 1 (*b*)) and as a twelve-bit field in another format (see FIG. 1(*c*)) and is defined to be used for routing of the cell. The VCI field is also used for routing in the defined format and is defined as a sixteen-bit field.

The de Prycher reference further describes the format of the ATM cell, for example at pages 55–124 and, especially at pages 106–108.

It is important to note that the defined cell header does not provide area for data supporting hop count information.

ATM Switching

Two primary tasks are accomplished by an ATM switch: (1) translation of VPI/VCI information and (2) transport of cells from the input port to the correct output port. The functions of an ATM switch are more fully described in Handel et al. at pages 113–136.

A switch is typically constructed of a plurality of switching elements which act together to transport a cell from the input of the switch to the correct output. Various types of switching elements are well-known such as matrix switching elements, central memory switching elements, bus-type switching elements, and ring-type switching elements. Each of these are discussed in greater detail in the Handel et al. reference and each carries out the above-mentioned two primary tasks.

Translation of the VPI/VCI information is important because in a standard ATM network the contents of these fields only has local meaning (i.e., the same data would be interpreted differently by each switch). Thus, the VPI/VCI information is translated by each switch and changed prior to the cell being output from the switch. Translation of the VPI/VCI field will be described in greater detail below in the Detailed Description of the Preferred Embodiment, especially with reference to FIG. 8(*b*) and 8(*c*).

Broadcast messages and Tree topologies

The present invention relates specifically to methods and apparatus for broadcast of messages. It is well-known in networking applications to provide for capability to transmit a message to all nodes on a network or all nodes on a subnetwork. Transmitting such a packet or cell to all destinations on the network (or all destinations on a subnetwork) is known as "broadcasting". Various methods have been proposed to implement broadcasting.

Of course, one simple method is to simply address individual packets to all destinations. This method is both wasteful of bandwidth and requires the impractical limitation of each sending node maintaining a complete list of addresses of all destinations.

Another method of broadcasting a message which has been commonly proposed for use in ATM networks involves use of a spanning tree. A spanning tree is a subset of the network which includes all switches but contains no loops. This may be better explained with reference to FIG. 3 which illustrates a network having three switches 311, 312 and 313. A spanning tree may allow switch 1 to receive a cell on channel 301 and to output the cell on channel 303. The cell may then be received by switch 312 and be output onto channel 304. However, switch 312 will not output the message onto channel 302 because, if it did so, a loop would be formed. Importantly, this method requires superimposition of a tree topology on the network which leads to complications in set-up of the network.

A general description of broadcasting of messages may be found with reference to Tanenbaum, A. S., *Computer Networks*, second edition, Prentice-Hall, Inc., 1988, pp. 306–309 (hereinafter Tanenbaum). Use of a tree topology is further described in Segal, A., Barzilai, T. P., Ofek, Y. *Reliable Multiuser Tree Setup with local Identifiers*, IEEE Journal on Selected Areas in communications, Vol. 9, No. 9, December, 1991, pp. 1427–1439 (hereinafter the Segal reference). The Segal reference discusses use of tree topologies in ATM and ATM-like networks.

The de Prycher reference teaches that classical packet switches networks only have required point-to-point switching and that broadcast functionality has not been required. However, de Prycher teaches that in future systems broadcast functionality will be required. (See, e.g., page 130). However, discussions in the de Prycher reference suggest use of a topology-dependent scheme as the likely design to support broadcast of cells. The de Prycher reference does teach, for example, at page 107–108, that the CCITT standard does provide for a reserved value to be placed in the VCI field of the cell header to indicate the cell is to be broadcast (the value is defined to be 0000 0000 0000 0010$_2$, e.g. 2$_{10}$). However, neither the standard or the de Prycher reference is understood to teach a system utilizing the present inventions method and apparatus allowing for topology-independent broadcast of messages.

Finally, . Perlman, *An algorithm for distributed computation of a spanning tree in an extended LAN*, in Proc. Ninth Data Commun. Symp., Whistler Mountain, British Columbia, Sep. 10–13, 1985, pp. 44–53, (hereinafter Perlman) discloses a spanning tree algorithm for use in local area networks. In the Perlman reference, an algorithm is disclosed which allows an extended network to consist of some arbitrary topology. The algorithm is run by bridges and computes a subset of the topology that connects all LANs yet is loop-free (i.e., is a spanning tree).

Flooding and Hop-counts

Flooding of a network, a process in which every incoming packet on a network is sent out on every outgoing line, except for the line it is received on, is one known method to broadcast information on a network. Flooding is more fully described in Tanenbaum at, for example, pages 298–299. Importantly, absent some form of control, flooding may lead to infinitely looping packets in networks which have loops (e.g., non-tree structured networks).

One common form of control which is used in conjunction with flooding is use of a hop counter which is contained in each packet and which is decremented each time the packet is forwarded. When the hop counter reaches zero, the packet is discarded. It is known that, ideally, the hop counter should be initialized to the length of the path from the source to the destination. If the source does not know the length of the path, it can initialize the hop counter for a worst-case scenario.

Of course, alternatives to hop counters are available. One such alternative, utilizing sequence numbers, is described in Tanenbaum at pages 298–299. Other alternatives are, of course, within the reach of one of ordinary skill in the art. For example, instead of counting down to a predetermined value (e.g., zero) as is done with traditional hop counters, a counter may be employed which starts at a predetermined value (e.g., zero) and counts up to some maximum. Another alternative may employ use of timestamps in the messages and messages may timeout after some predetermined period of time. In general, any of these methods may be thought of as employing information in the packet to facilitate expiration of forwarding of the packet at some point in the packet's life. This type of information may be referred to herein as expiration information.

It is noted that use of timers as expiration information is described at., for example, Comer, D. E., *Internetworking with TCP/IP. Vol I: Principles. Protocols. and Architecture*, Second Edition, Prentice Hall, 1991 pp.91–99 (hereinafter Comer).

As has been pointed out, ATM networks employ cells having a well-defined header area. The current definition of header area does not provide an area for expiration information and the header area may not be easily expanded to include such an area both because of the need for compliance with the established standards and because expansion of the header area will cause increased overhead in cell transmission on the network. Further, it is not desirable to add expiration information within the cell's information area both because this would take valuable space in the information area and, thereby, increase overhead and because placing the expiration information in the information area may require either: (1) software translation of the information area at each switching point which would lead to a slowdown in switching of cells through the network or (2) an increase in the complexity of the switching fabric to handle additional fields of information.

OBJECTS OF THE INVENTION

Therefore, what is desired is to develop a topology-independent method and apparatus allowing for broadcast transmission of cells in an ATM network or the like.

It is further desired to develop such a method and apparatus while conforming with established standards for such ATM networks.

It is further desired to develop such a method and apparatus while allowing for rapid forwarding of cells through the switches of the network, such switching time at least fast enough to be in compliance with the established standards.

It is further desired to develop such a method and apparatus while allowing for forwarding of broadcast cells through switches of the network with switching times at least fast enough to be in compliance with established standards and generally with switching times similar to switching times for other non-broadcast cells.

In particular, it is desired to develop a method and apparatus utilizing flooding of cells on an ATM network or the like in order to accomplish broadcast of cells on such a network.

It is further desired to develop a method and apparatus utilizing expiration information in the cells in order to prevent infinite looping of such cells on the network.

These and other objects of the present invention will be better understood with reference to the below Detailed Description and the accompanying figures.

SUMMARY OF THE INVENTION

The present invention provides a method and apparatus allowing for topology independent broadcast of cells in an ATM network or the like while following established standards for such a network. In attempting to accomplish the objects of the present invention, it has been advantageously discovered that cells certain fields, established by standards for such networks, may be "misused" when it is desired to broadcast a cell on the network. In particular, standards for ATM networks provide for virtual path identifier (VPI) and virtual channel identifier (VCI) fields. It has been discovered that these fields may be "misused" when it is desired to broadcast a cell such that, for example, a indication is placed in the VPI field indicating the cell is a broadcast cell and expiration information (such as a hop count) is placed in the VCI field in order to prevent infinite looping of the cell on the network.

Thus, in the present invention, a method and apparatus for broadcast of cells in an ATM network has been discovered in which the header area of a cell to be broadcast is "misused" (i.e., used other than in conformance with the established standards) to including a first area having therein an indication the cell is a broadcast cell and a second area having therein expiration information and, in particular, a hop count. The station sending the cell so formats the header and then transmits the cell onto the network The cell is then received by a switch which examines the header information. The switch then determines if the first area includes the indication that the cell is a broadcast cell. If it does not, processing of the cell continues in accordance with the established and known methods for operation ATM networks. If the cell does include the indication, the second area is accessed to determine if the cell has "expired". Preferably, accessing of the second area includes examining the a hop count and, if the hop count is greater than a predetemined value k, decrementing the hop count and then forwarding the cell. If the hop count is less than or equal to the predetermined value k, the cell is not forwarded. Of course, alternatives to use of hop counts are available and utilizing such alternatives is well within the area of skill of the ordinary person involved and skilled in the pertinent art. Several of these alternatives have been discussed above in the Background section.

BRIEF DESCRIPTION OF THE DRAWINGS

FIG. 8(a) is an illustration of a switch fabric as may be used by a switch of the present invention.

Figure 3:
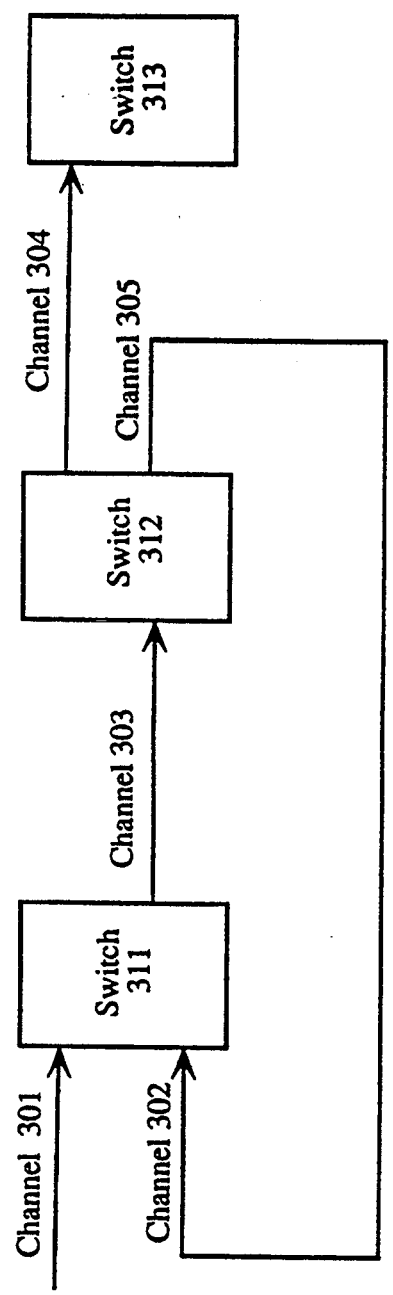
FIG. 3 is a diagram illustrating a network as may be used in connection with the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE PREFERRED EMBODIMENT

What is described herein is a method and apparatus for allowing broadcast of messages in an Asynchronous Transfer Mode (ATM) network or the like. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

OVERVIEW OF ATM NETWORKS

The present invention relates to methods and apparatus for topology-independent methods and apparatus for communication of cells in an ATM network or the like and especially relates to methods and apparatus for broadcast of messages in such a network. ATM networks are more fully described in, for example, de Prycher at pages 55–89 and, more specifically with reference to standards adopted by the International Telephone and Telegraph Consultative Committee (CCITT), at pages 97–124. Briefly, it should be understood that ATM is a telecommunication technique or transfer mode implemented to facilitate a broadband network such as the Broadband Integrated Services Digital Network (B-ISDN) in which cells of data are asynchronously transferred between two switching devices without the need to synchronize the clocks of the sender and the receiver packet.

Of course, alternatives to ATM networks have been proposed which employ principles similar to the principles employed by ATM networks. In general, when the term "ATM networks and the like" is used herein, such term may be thought of as covering networks having the basic characteristic of packet switching with minimal functionality in the network. For example, ATM has been the official name adopted by the CCITT for such a network. Asynchronous Time Division (ATD)

and Fast Packet Switching are terms which have been employed to describe similar network transfer modes. These alternative networks are discussed in de Prycher at pages 55–56.

ATM according to the standards adopted by the CCITT

Figure 4:
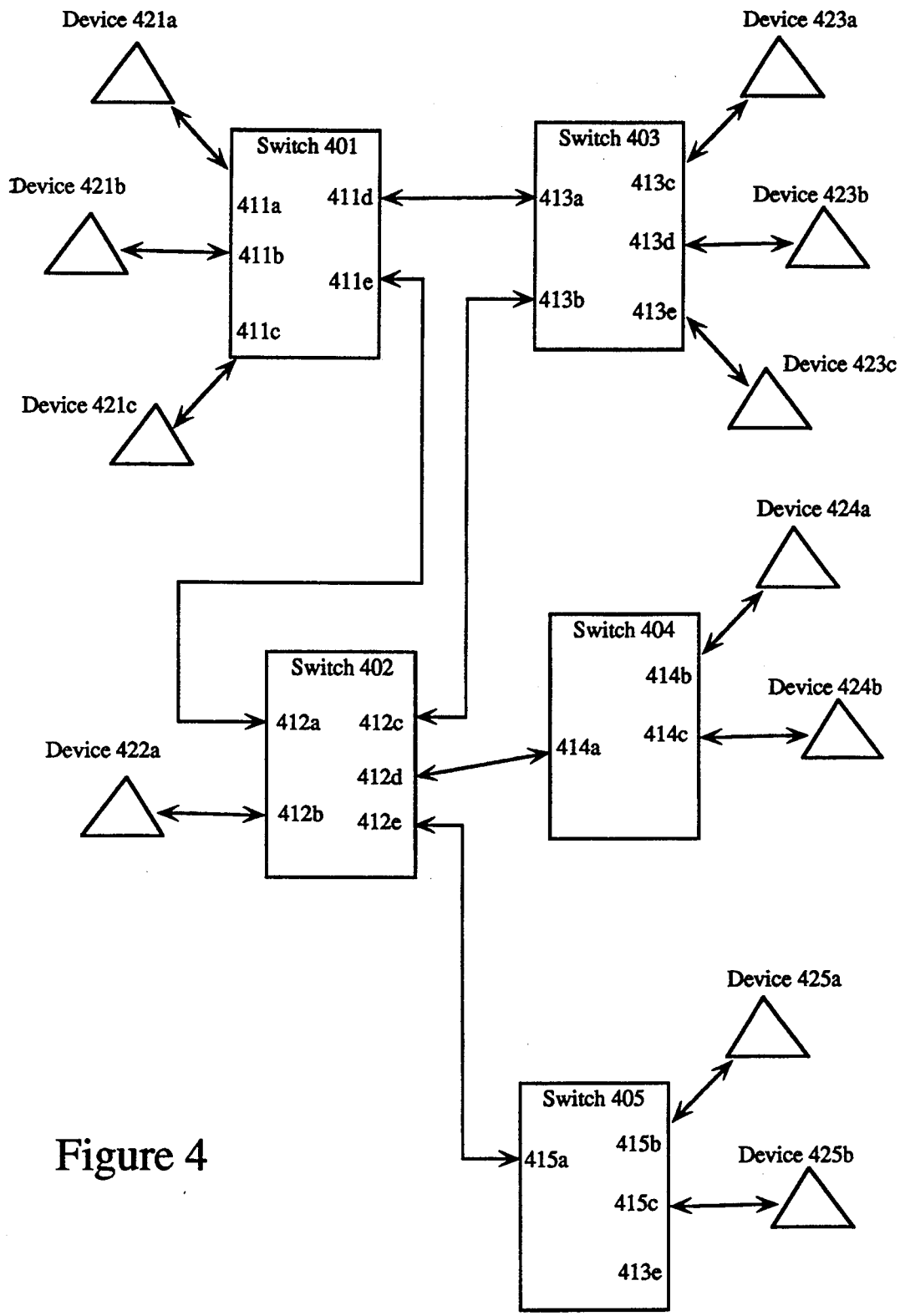
FIGS. 4–7 are diagrams illustrating a network as may be used in connection with the present invention.

It may now be useful to describe in greater detail a network implementing asynchronous transfer mode according to the standards adopted by the CCITT. FIG. 4 is a diagram illustrative of a network which may be developed implementing ATM. The diagrammed network comprises 5 switches 401–405 each of which have a plurality of bi-directional ports 411a–e, 412a–e, 413a–e, 414a–c and 415a–c. These switches 401–405 may be of the type described below in connection with FIG. 2 and the description of switch 201. The ports are used for interconnecting the switches 401–405 with each other as well as for interconnecting the switches 401–405 with various devices 421a–c, 422a, 423a–c, 424a–b and 425a–b. It might be noted that ATM switches, such as switches 401–405 are also sometimes referred to in the art as ATM cross-connects.

Thus, a cell may be transmitted from, for example, device 421a to device 425b by transmitting the cell first from device 421a to switch 401 on port 411a, then the cell is output from switch 401 on port 411e and is received by switch 402 on port 412a, then the cell is output from switch 402 on port 412e to switch 405 where it is received on port 415a and, finally, the cell is output switch 405 on port 415c and is transmitted to device 425b. In an ATM network, there is often multiple possible paths for delivery of a cell. For example, as can be appreciated from a review of FIG. 4, the cell just-discussed may have been delivered via switch 401 through switch 403 to switch 402 and, finally, to switch 405. This path may be chosen, for example, because port 411e is busy while port 411d is available.

Potential looping in the network of FIG. 4

As can be appreciated, if an attempt is made by device 421a to broadcast a cell on the network described in connection with FIG. 4, the broadcast cell may loop forward absent some constraint imposed by the network. To illustrate this, it can be seen that the broadcast cell would be received on port 411a and, in accordance with the broadcast rules of outputting the cell on all ports except for the port it was received on, the cell would be output on ports 411b–e. Thus, the cell would be received by both device 421b and device 421c. In addition, the cell would be received by switch 402 on port 412a and would be received by switch 403 on port 413a. Each of switches 402 and 403 would then, in accordance with the broadcast rules, output the cell on all ports except for the port the cell was received on, i.e., switch 402 would output the cell on ports 412a–e (importantly, as will be seen, including outputting the cell on port 412c) and switch 403 would output the cell on ports 413b–e (importantly, as will be seen, including outputting the cell on port 413b). Of course, it is now easy to see that switch 403 will then receive another copy of the cell from switch 402 on port 413b which it will in turn output on all ports so that the cell is again again received by switch 401, which will again transmit to switch 402, creating the first infinite loop. Switch 402, in a similar fashion, receives another copy of the cell on port 412c which it forwards on each of its ports, including forwarding to switch 401, which will again forward it to switch 403, creating a second infinite loop.

Imposition of a tree-structure on the network of FIG. 4

Figure 5:
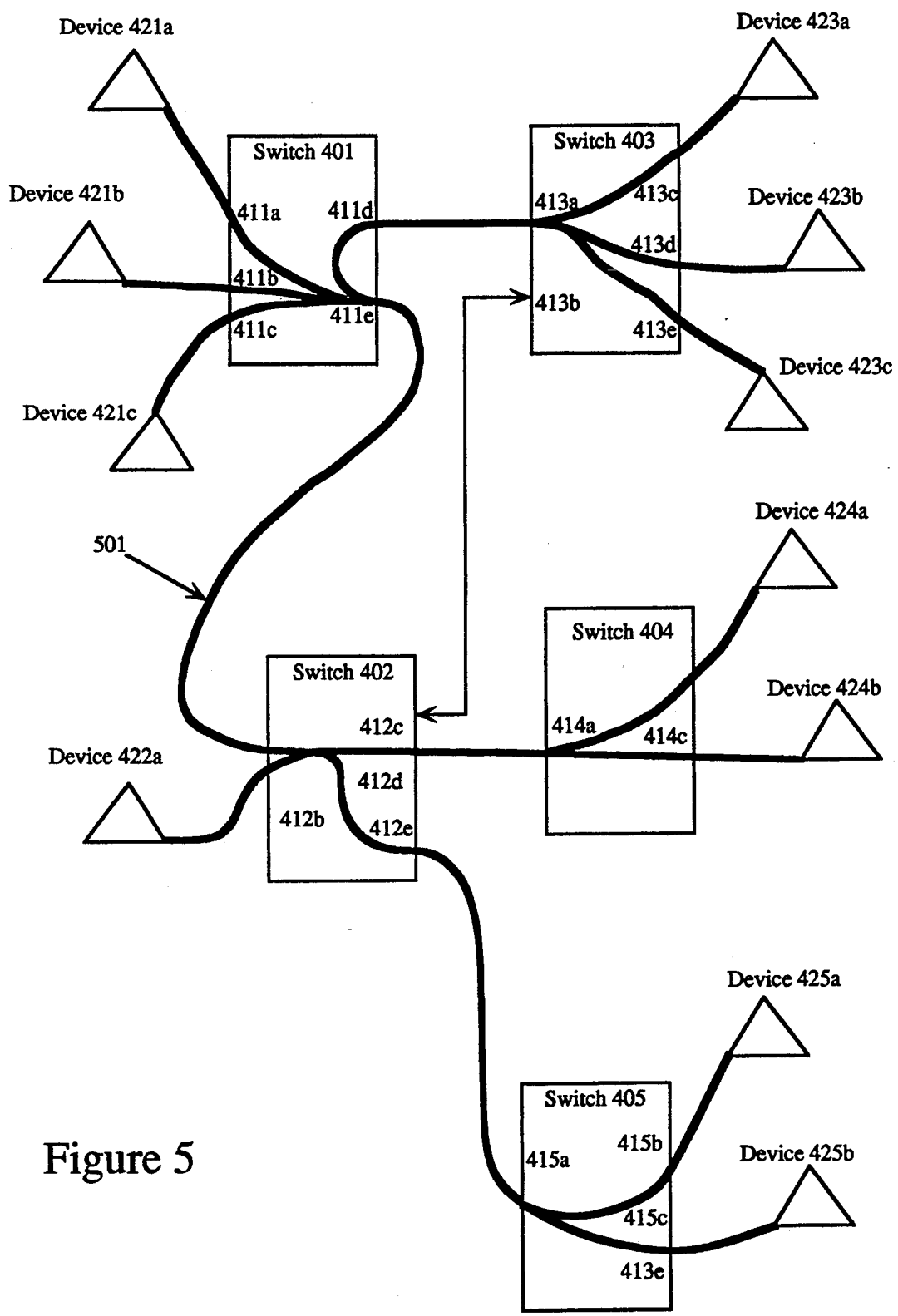

One known method of preventing such infinite loops is to impose a tree-structure on the network. The tree-structure is utilized when broadcasting cells and, importantly, the tree-structure does not include any loops. Such a tree structure is illustrated with reference to FIG. 5 in which figure a tree-structure 501 is shown superimposed on the network. Importantly, there is no branch on the tree-structure 501 from switch 402 to switch 403. Thus, no loop can be created and infinite loops are avoided. Below in Table I is given the basic contents of a broadcast translation table for switch 403 which illustrates that there is no path defined for broadcast messages, either input or output, over port 413b, thus avoiding looping on this network by imposition of a tree-topology.

TABLE I

Broadcast translation table for Switch 403 with tree topology

| Message arrives on Port # | Transmit to Port #'s |
| --- | --- |
| 413a | 413c, 413d, 413e |
| 413c | 413a, 413d, 413e |
| 413d | 413a, 413c, 413e |
| 413e | 413a, 413c, 413d |

Figure 6:
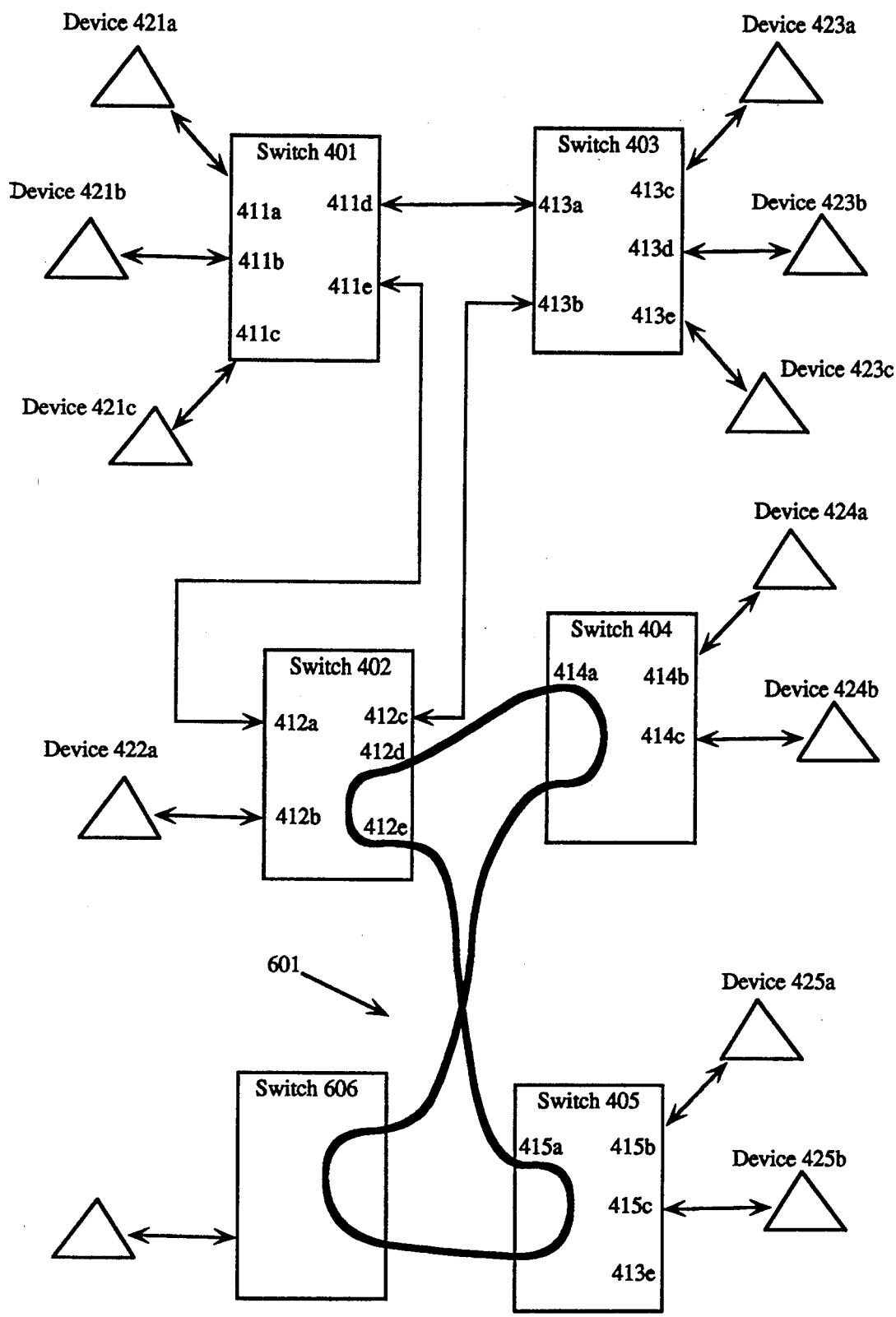
Figure 7:
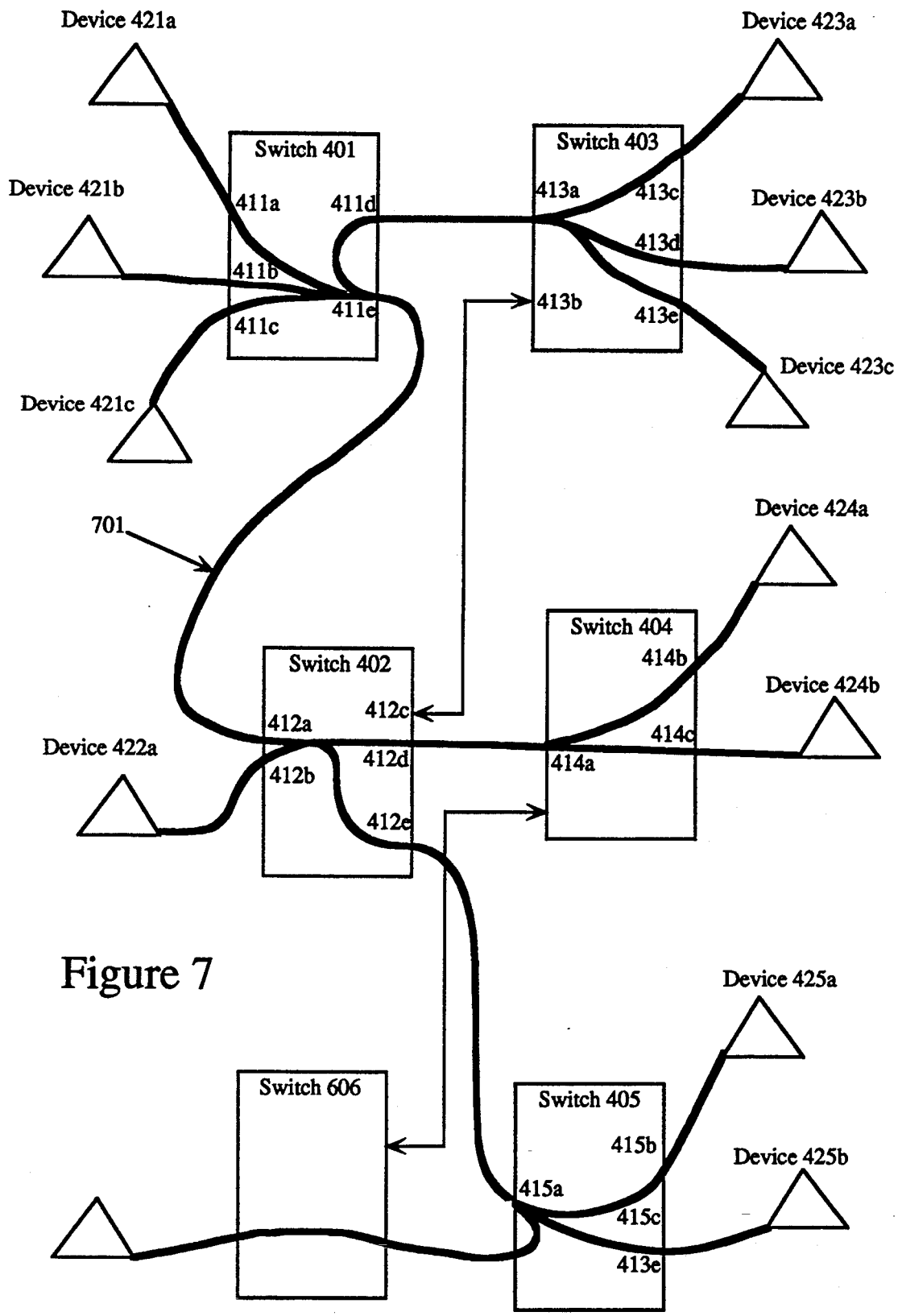

Of course, as can be appreciated, in large, complex networks defining such tree-structures can be time-consuming and error prone. In addition, whole paths through the network are eliminated (i..e, the path from switch 401 to switch 402 through switch 403) which may slow down or prevent certain communications. FIG. 6 illustrates an addition of a new switch 606 to the network. This, of course, potentially creates a new loop 601 and the tree-structure 501 illustrated by FIG. 5 must be reconsidered. FIG. 7 illustrates the new tree-structure 701 in which the direct path between switch 404 and switch 606 goes unused for broadcast messages.

Before continuing by describing the topology-independent broadcast method and apparatus of the present invention, it may be worthwhile to describe the ATM cell as defined by the CCITT standards and to describe the switch fabric of a switch such as switches 401–405 and 606.

The ATM cell as defined by the CCITT

Figure 1A:
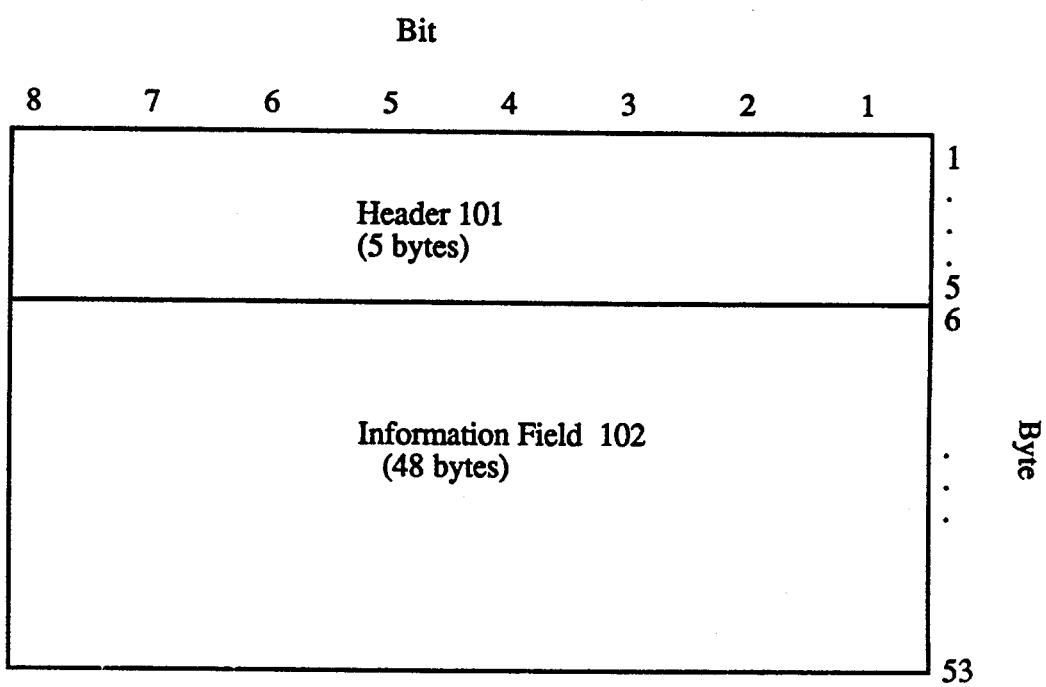
FIG. 1(a) is a diagram illustrating the format of a cell as may be transmitted in the network of the present invention.

The basic cell structure of an ATM cell as defined by the CCITT is illustrated by FIG. 1(a) and includes a fixed-size header area 101 and a fixed-size information field or payload area 102. The header area 101 is defined to include 5 8-bit bytes while the information field 102 is defined to include 48 8-bit bytes for a total of 53 8-bit bytes per cell. The information field 102 is available for user information while the header field is well-defined by the CCITT standard and includes necessary overhead dam. In fact, two header definitions are set forth by the CCITT standard and these header definitions are described in connection with FIG. 1(b) and FIG. 1(c). The first header definition is used at the B-ISDN user-network interface and the second header definition is used at the B-ISDN network-node interface. The two formats only differ in the first byte and the difference is not of significance to the present invention.

FIG. 1 (b) illustrates an ATM cell header for a B-ISDN user-network interface. Field 111 is a 4-bit field used for generic flow control (GFC) which assists in control of traffic flow from ATM connections at the user-network interface. ATM networks do not provide for flow control of the type which is implemented in some packet networks and ATM networks have no facility to store cells over a long period of time. Therefore, inside an ATM network there is no need for generic flow control. Thus, in the header definition of FIG. 1 (c), there is not GFC field and the virtual path identifier field 112 is expanded to use the bits made available by elimination of the GFC field 111.

Figure 1B:
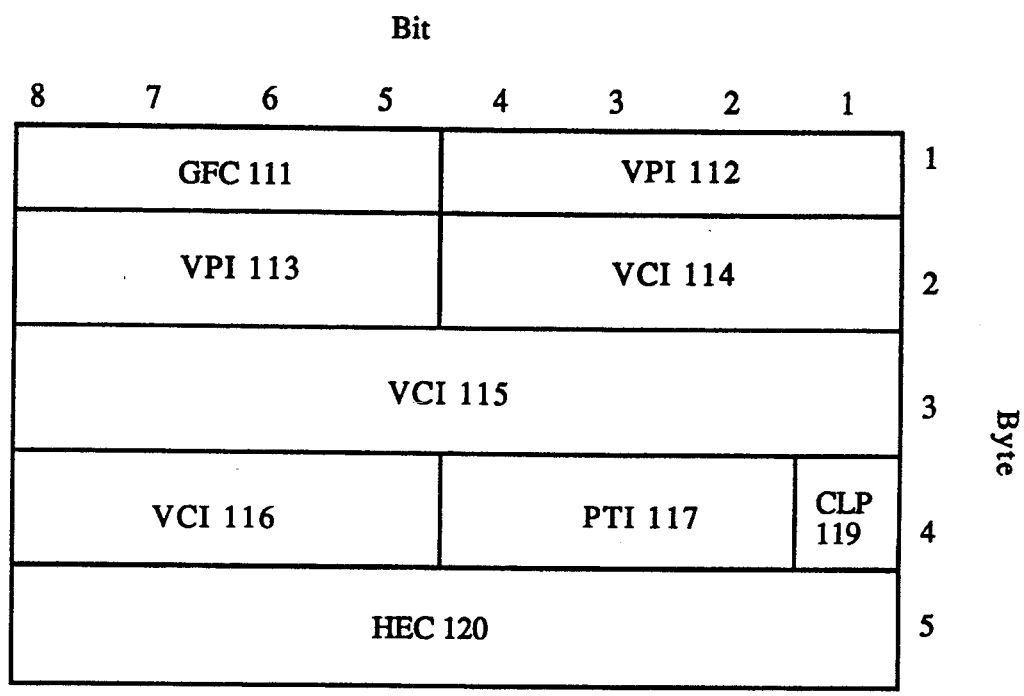
FIG. 1(b) is a diagram illustrating one format of a cell header of cells as may be transmitted in the network of the present invention.
Figure 1C:
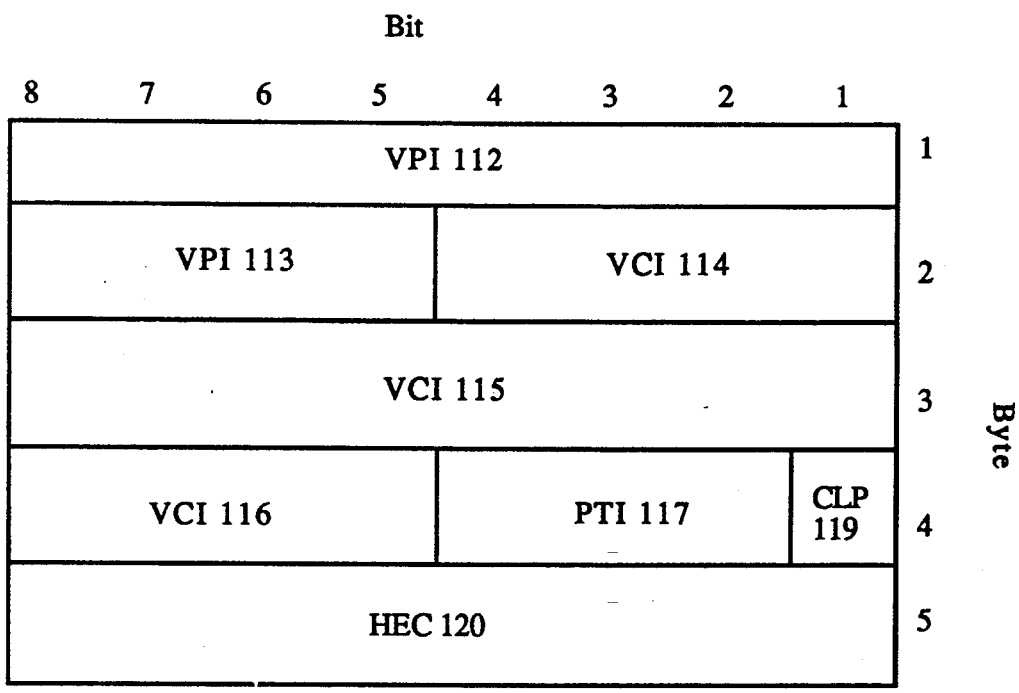
FIG. 1(c) is a diagram illustrating a second format of a cell header of cells as may be transmitted in the network of the present invention.

The virtual path identifier (VPI) comprises either 8-bits, in the case of user-network interface headers, or 12-bits, in the case of node-network interface headers. As illustrated in FIGS. 1(b) and 1(c), the 8- and 12-bits respectively are broken down in a first field 112 of either 4- or 8-bits in the first byte of the header and the high let 4-bits in a second field 113 of the second byte of the header. The VPI field identifies a virtual path for routing the cell through the network.

The virtual channel identifier (VCI) comprises 16-bits broken down in three fields, a first field 114 being the low order 4-bits in the second byte of the header, a second field 115 being the 8-bit third byte of the header, and a third field 116 being the high order 4-bits in the fourth byte of the field. The VCI identifies the virtual channel for muting of the cell. Certain values have been defined by the CCITT standard, including use of the value 0000 0000 0000 0010$_2$ (i.e., $2_{10}$), to indicate the cell is a broadcast cell.

Bits 2-4 of the fourth byte of the header comprise the payload type (PT) field 117. Cells carrying user information are marked by the payload type field 117 being loaded with 000$_2$; other payload types have not been defined.

Bit 1 of the fourth byte is the cell loss priority (CLP) field 119. If the value of the field is 1, the cell is subject to discard, depending on network conditions. If the value of the field is 0, the cell has high priority and, therefore, sufficient network resources have to be allocated to it.

Finally, the header error control field 120 takes the entire fifth byte of the header. It contains the header error control sequence to be processed by the physical layer of the network and is specified in CCITT Recommendation I.432.

As can be appreciated, a header functionality has been kept to a minimum by the standard in order to provide for fast processing in the network. The main functions of the header are identification of the virtual connection and certain maintenance functions. By keeping these functions to a minimum, header processing in the ATM nodes is simple and can be done at very high speeds. Thus, any proposal to increase the header area to provide for additional functionality, such as a proposal to include a hop count field, is likely to be met with opposition.

The switch fabric

Figure 2:
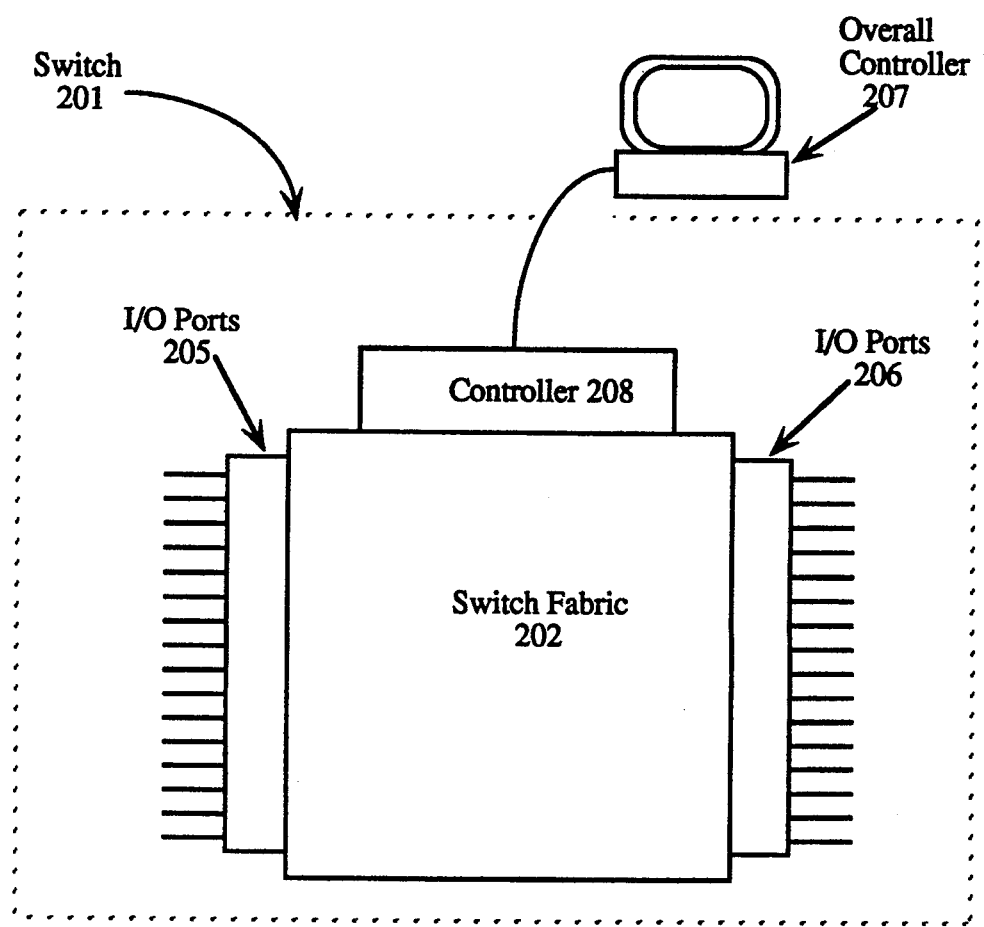
FIG. 2 is an overall diagram illustrating a switch as may be utilized by the present invention.

FIG. 2 is an overall diagram of a single switch 201 as may be used in the present invention. The switch 201 comprises a first set of I/O ports 205 and a second set of I/O ports 206 which are coupled through a switch fabric 202. The switching fabric 202 is comprised of identical basic switching building blocks, interconnected in a specific topology. The topology will be discussed generally below in connection with FIG. 8(a). The switch 201 further comprises controller circuitry 208 for coupling an overall network controller 207. The overall network controller 207 is provided to set up virtual path translation tables (VPXTs) and virtual channel translation tables (VCXTs) as well as to provide other control information to and to receive status information from the various switches within the network. Generally, only a single overall controller 207 is provided in the network coupled with a single of the switches 201 and information may be passed from the overall controller 207 through the switch to which it is coupled to the other switches on the network.

FIG. 8(a) is a diagram illustrating the switching fabric 202 of a basic ATM switch. Of course, it is understood that various alternative switching fabrics may be employed. A number of these alternative switching fabrics are described in both Handel et al. and de Prycher. The switching fabric 202 illustrated in FIG. 8(a) includes 4 stages labeled as stage 801, stage 802, stage 803 and stage 804. Each stage comprises 8 switching blocks, such as switching block 806, each having two ports for a total of 16 ports. The ports are each bi-directional. Stage 801 is the initial input/output stage which is coupled with I/O ports 205 (illustrated in FIG. 2). An analysis of the switching fabric will show that a cell input on any of the 16 ports may be switched through the fabric to be output on any of the 16 ports of stage 804. Stage 804 is coupled with I/O ports 206. An example of a path through the switching fabric is illustrated by darkened line 807 which shows the path of a cell input on port 5 of stage 801 and switched through the switching network 202 to be output on port 13 of stage 804.

It is important to note that a cell may be copied or duplicated in each of the switching blocks so that, for example, a cell entering at stage 801, port 5, may be copied so that one copy is output on the port illustrated by line 807 and another copy is output to be received by switch block number 2 of stage 802. By extension of this copying principle, it can be seen how broadcast of messages may be accomplished in a switch fabric of this type.

Table-controlled switching

Figure 8B:
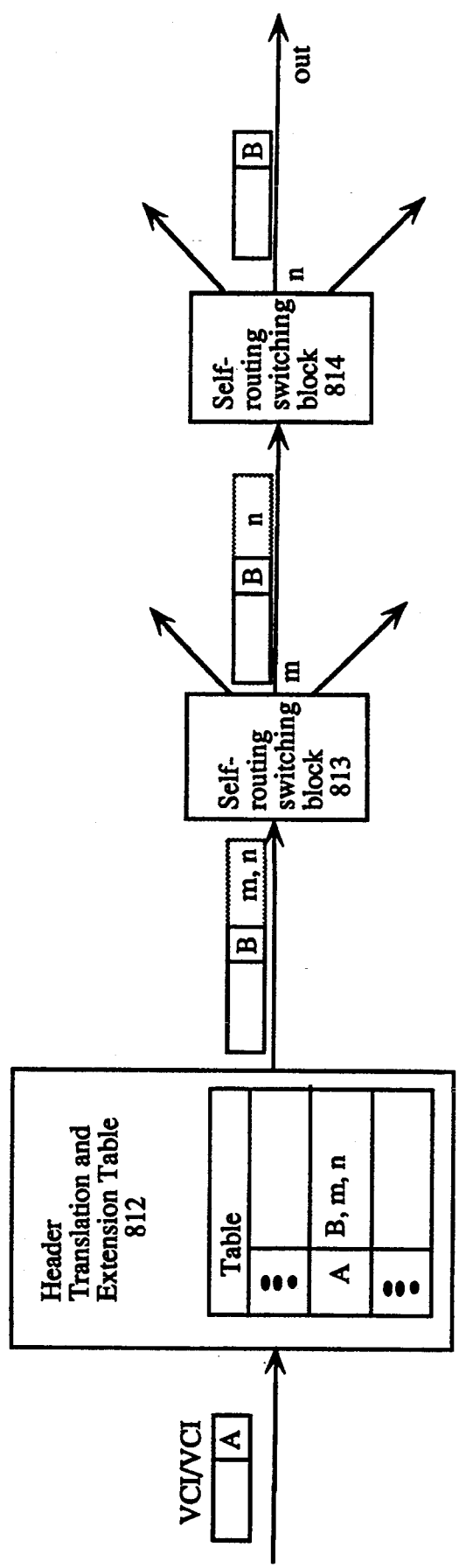
FIG. 8(b) is an illustration of routing using switching blocks as may be implemented in the present invention.
Figure 8C:
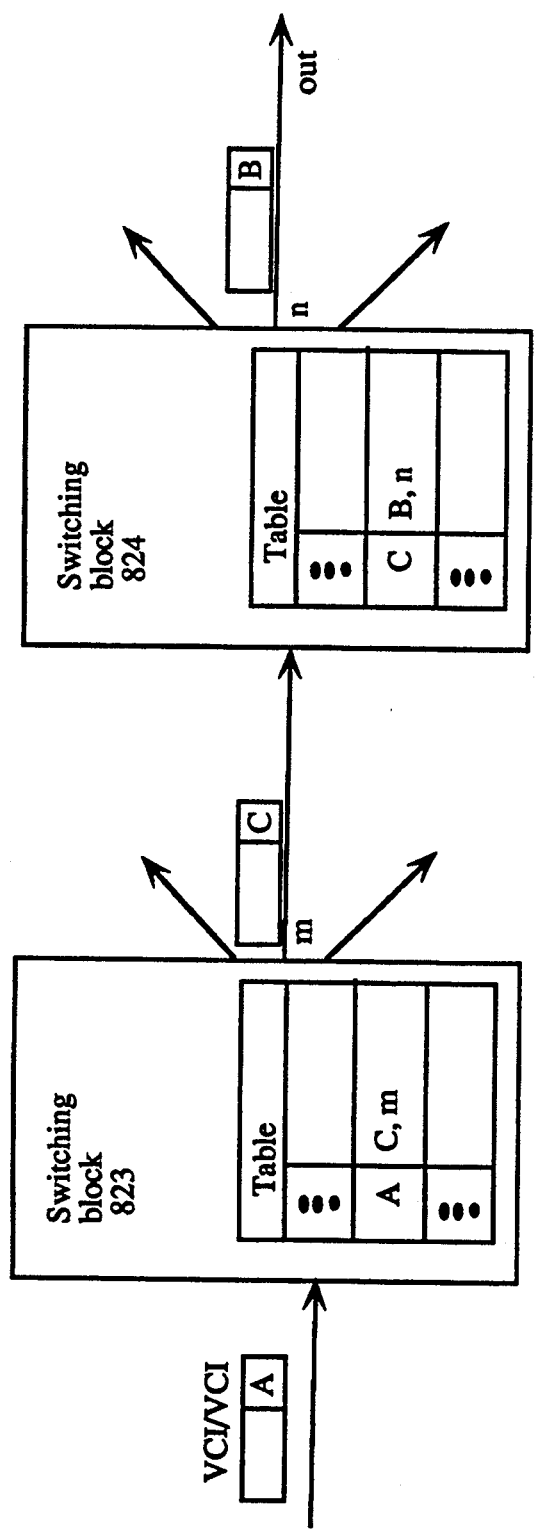
FIG. 8(c) is an illustration of routing using switching blocks as may be implemented in the present invention.

FIG. 8(b) and 8(c) are useful for an understanding of use of the VPI and VCI fields for switching through a network. As was mentioned earlier, two primary tasks of an ATM switch 201 are (1) translation of VPI/VCI information and (2) transport of cells from the input port to the correct output port. Transport of cells from the input port to output ports has been discussed in connection with FIG. 8(a). Translation of the VPI/VCI information and transport of cells will now be further discussed. Them are two basic approaches which may be applied in ATM switches: (1) a so-called "self-routing principle" and (2) a so-called "table-controlled principle". The self-routing principle is better described in connection with FIG. 8(b) and the table-controlled principle is better described in connection with FIG. 8(c).

An ATM switch using the self-muting principle only performs VCI/VPI translation at the input of the switching network 202. A header translation and extension table 812 is provided from which the VCI/VPI information is translated and extended. For sake of simplicity, only translation of the VPI information is illustrated by FIG. 8(b). A cell having a VPI value "A" is received by the switching network and the VPI value "A" is applied to the table 812. The VCI/VPI information is translated and extended (only internally in the switch 201) to include internal header information. In the illustrated example, the VPI information is translated from the VPI value being "A" to the VPI value being "B". In network with k stages, the internal header is subdivided into k subfields. Subfield i contains the destination output number of the switching element in stage i. As illustrated in FIG. 8(b), the internal header includes two subfields "m" and "n" and these subfields are used to direct the cell to be output on output m of the first stage of the switch fabric (stage 813) and to be output on output n of the second stage of the switch fabric (stage 814). It is noted that increasing the length of the cell header results in a requirement for an increased network internal speed.

FIG. 8(c) is useful for illustration of table-controlled switching principles. In a switch using table-controlled switching principles, the VPI/VCI of the cell header is translated at each switching element into a new value. Therefore, the cell header length need not be increased. Each switch block, such as switch block 823 includes a translation table. In the illustrated example, at the first switch block 823 the VPI field is translated from "A" to "C". In addition, the translation table in switch block 823 includes the appropriate output port number (in this case, "m") to identify the output port. The cell is then received by switching block 824 and the VPI is translated from "C" to "B" and the table entry indicates the cell should be output on output n. Of course, use of table-controlled switching principles leads to increased complexity in the network at least because of the increased number of tables which must be maintained.

TOPOLOGY-INDEPENDENT BROADCAST OF CELLS IN AN ATM NETWORK OR THE LIKE

The present invention has implemented a method and apparatus allowing for topology-independent broadcast of cells in an ATM network or the like. As has been discussed, known techniques exist to pre-configure a spanning tree in order to avoid the problem of broadcast cells looping in an ATM network Such techniques require imposition of a tree topology on the network and are considered to be cumbersome to set up and complex.

Of course, it is desired to work within the constraints set forth by established standards for ATM networks. In development of these standards, tradeoffs have been considered between expanding the size of the cell header in order to provide for increased information to be carried in the header and limiting the size of the cell header in order to provide for efficiencies in processing of cells in switches in the network. One such standard has been set by the CCITT and this standard is of particular interest to the present invention. However, the present invention is applicable to any standard or implementation which fails to specifically support a field in the header allowing for "expiration" of cells in order to prevent looping of broadcast cells. In particular, there is no field provided in the standard header to be used as a "hop count" or similar value which could be examined and/or manipulated by the switches in the network in order to prevent looping of broadcast cells.

Briefly, the present invention provides that when a source node desires to broadcast a cell on the network, fields in the cell header are "misused"; that is, these fields are used in other than the way defined by the applicable standard. In particular, it has been discovered that fields in the cell header may be "misused" to provide for indication that a cell is a broadcast cell and to provide for expiration of such broadcast cells.

Therefore, as will be seen, although established standards define that a broadcast function may be provided in ATM networks, there is no teaching by such standards of the particulars of how such broadcast of messages should be accomplished; and, in particular, there is no teaching of the present inventions "misuse" of header fields to accomodate cell expiration information.

Indication that the cell is a broadcast cell

Still more particularly, it has been discovered that in order to accomplish broadcast of a message, a Broadcast Channel Identifier (BCI) can be placed in the VPI field of the cell header. The BCI may be thought of as a predetermined value used to indicate the cell is a broadcast cell. In the preferred embodiment, the value used for the BCI is 1111 1111 1111 $1111_2$ (referred to herein as "all 1s"). Other values could be chosen in other embodiments. In this embodiment, it is noted that the BCI is the same for all broadcast cells and is not varied during the life of the cell.

Development of alternative embodiments may certainly be within the capability of the skilled artisan. For example, differing BCIs could be chosen for each VCI/VPI combination on each switch. The Broadcast Channel Identifier could then be placed as an entry in the Virtual Path Translation Table (VPXT) in each switch with a bit in the table set to indicate whether or not the entry represents a broadcast cell. This particular alternative embodiment leads to additional complexity in setup of the VPXT for each switch.

Expiration of forwarding of cells

Having now generally discussed the issue of indication that a cell is a broadcast cell in an ATM network it is time to discuss the present inventions method for allowing broadcast of cells without creating infinite loops in the system. As has been discussed previously, certain prior art techniques depend on network topology limitations, such as a tree topology, to insure a broadcast message does not infinitely loop. However, the present invention, wishing to avoid such topology limitations, has discovered that it is possible to "misuse" another field in the standard cell header in order to provide an indication that the cell has "expired". In particular, the present invention provides for storing information in a second field of the cell header, preferably in the VCI field, to facilitate indication that the cell has "expired"; that is, that the cell should not be forwarded by a switch. The present invention, in fact, provides that this expiration information may be implemented preferably as a hop count. The hop count is preferably initialized at the time the cell is set up to a predetermined value max_count. The predetermined value max_count is a value which is at least equal to the length of the longest path through the network plus a predetermined value k (the predetermined value k is discussed in greater detail below). This value max-count may vary from installation to installation.

The hop count is then decremented at each switch until the count equals a predetermined value k, at which time it is not forwarded (the predetermined value k is discussed in greater detail below). The hop count may be decremented by 1 at each switch. Alternatively, it is suggested that efficiencies are obtained by decrementing the hop count by a greater than 1 in certain cases. The decrement value may be, for example, sufficiently large to reduce the hop count to a value representative of the distance from the current switch to the most distant switch in the network.

It is now worthwhile the discuss the above-mentioned predetermined value k. The CCITT standard has defined certain predetermined values for the VCI field for special purposes. For example, 00000000 $00000001_2$ is preassigned by the standard for a meta-signalling channel; 00000000 00000010$_2$ is preassigned by the standard for a general broadcast VCI; and all zeros (i.e.,00000000 00000000$_2$) is preassigned to indicate cells designated for the physical layer and unassigned cells. It is recommended that users not use the preassigned VCI values for other than their standard purposes. Therefore, preferably, the value k is greater than the highest preassigned VCI value. In the current embodiment of the present invention, k is 20.

Any number of alternatives may be available. For example, the hop count could be initialized to the predetermined value k and then be incremented at each switch until it reaches the predetermined value max_count. In another exemplary alternative, a timestamp could be utilized in place of the hop count information. Each switch would then examine the timestamp to determine if some predetermined period of time had expired since the original transmission of the cell and, if so, the message would not be forwarded. Other fields in the cell header may also be used. Of course, many other alternatives may be available and what is important is simply that some information is stored in the cell header to provide for "expiration" of the cell in a field provided for storage of other information (i.e., a field is "misused" to store "expiration" information instead of the information called for by the applicable standard.)

METHOD OF PROCESSING A CELL IN A SWITCH OF THE PRESENT INVENTION

Figure 9A:
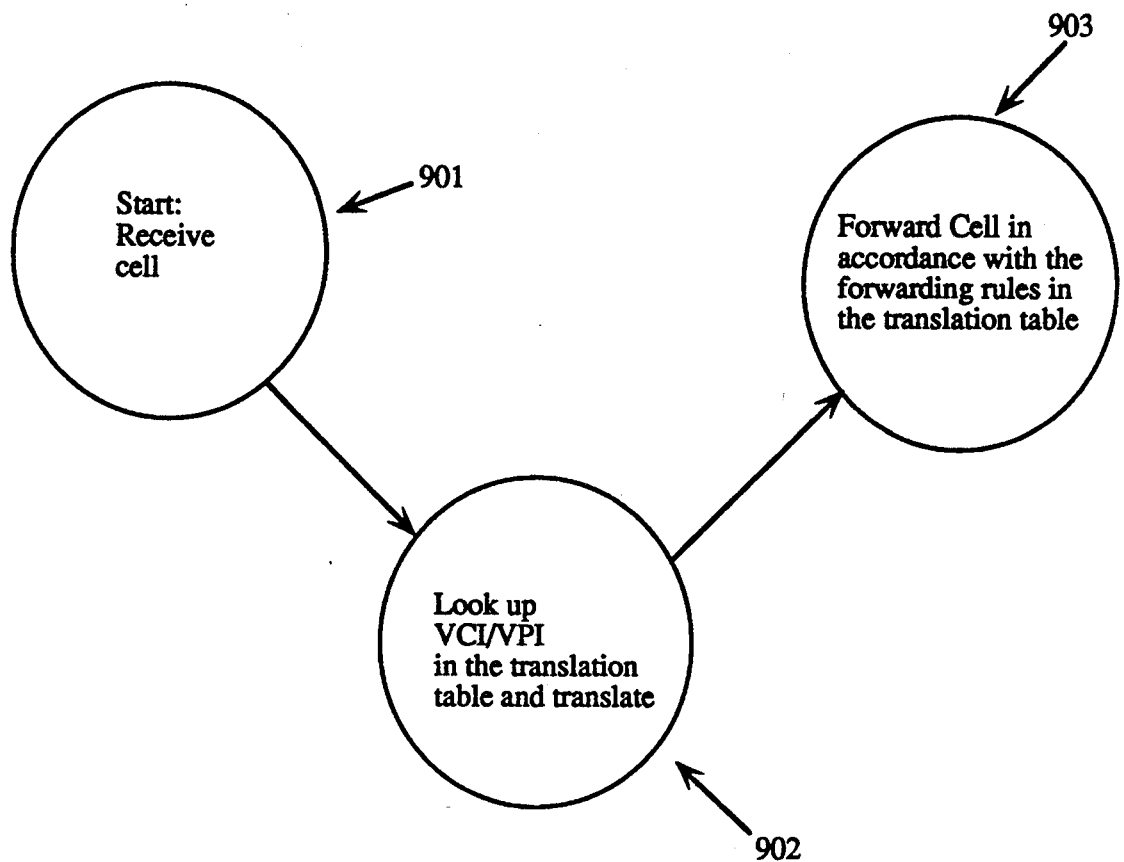
FIG. 9(a) is a diagram illustrating a prior art method of forwarding cells in a network.
Figure 9B:
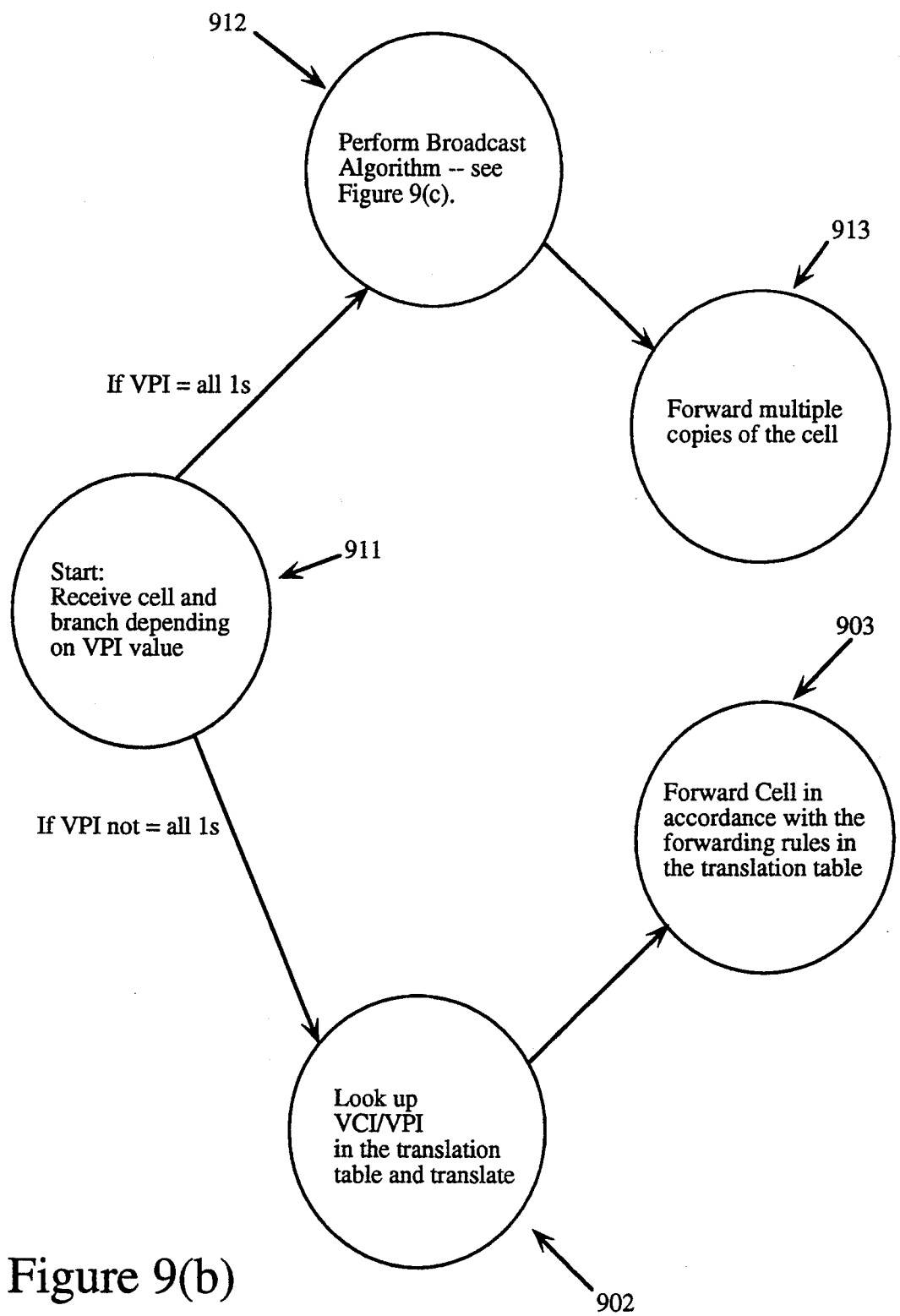
FIG. 9(b)–9(d) are diagrams illustrating methods of the present invention for providing for broadcast of cells in an ATM network.
Figure 9C:
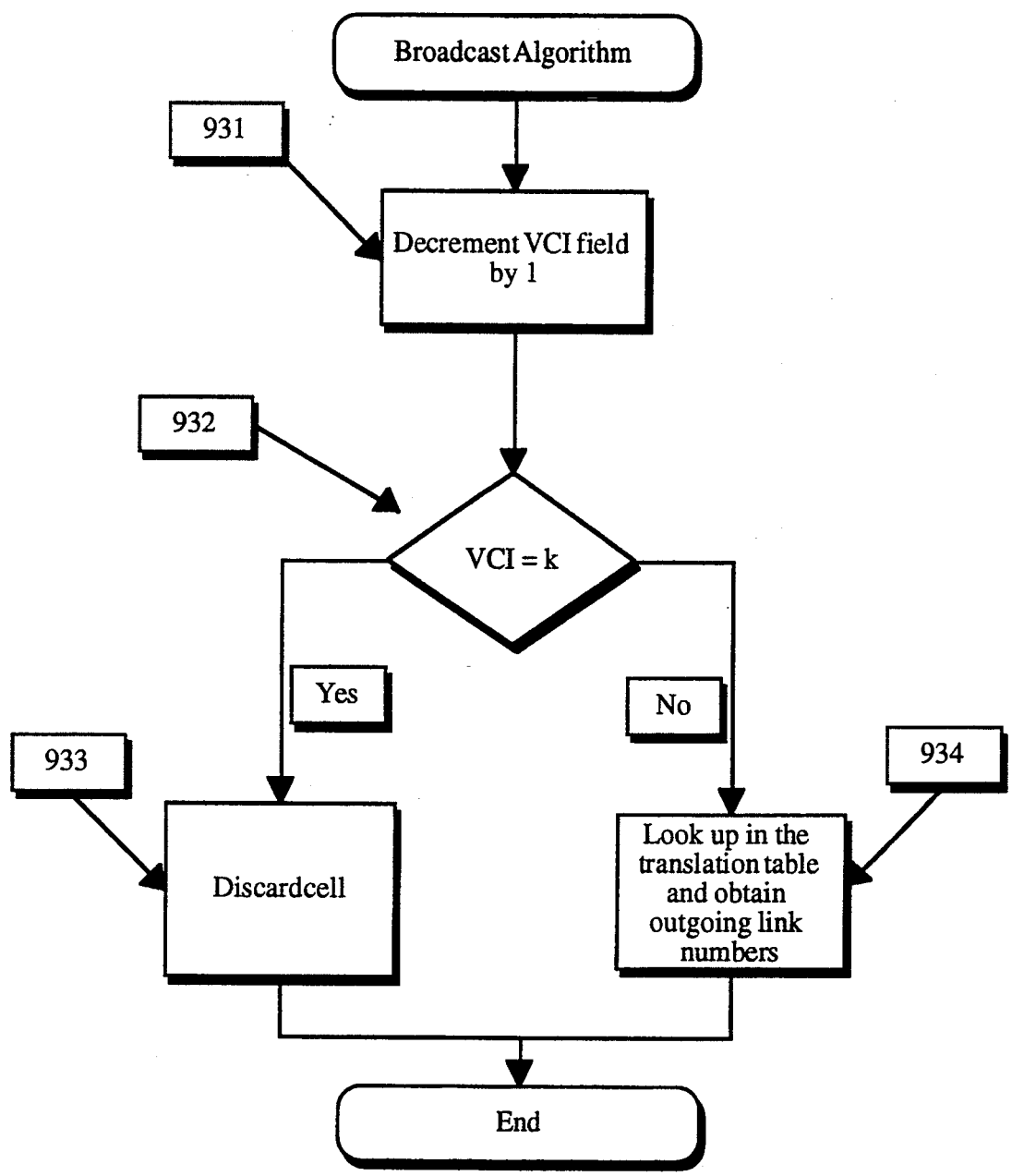

Turning now to FIGS. 9(a) through 9(c), the method of processing a cell in a switch of the present invention is discussed in greater detail.

FIG. 9(a) illustrates a prior art method of processing a cell in which initially, a cell is received by the switch fabric, block 901 and a look-up of the VPI/VCI is performed in the translation tables and the VPI/VCI information is translated as has been discussed, block 902. The cell is then forwarded in accordance with the forwarding rules given by the translation table, block 903.

FIG. 9(b) illustrates an overall flow diagram for processing a cell in a switch implementing the present invention. First, the cell is received and processing then branches depending on whether an indicator, in particular the VPI field, has been set to indicate the cell is a broadcast cell, block 911. As has been discussed, in the preferred embodiment, all 1s in the VPI field indicates the cell is a broadcast cell. If the cell is not indicated as being a broadcast cell, processing continues as was discussed in connection with FIG. 9(a) with looking up the VPI/VCI in the translation table, block 902 and forwarding the cell in accordance with the rules set forth in the translation table, block 903. However, if the cell is indicated as being a broadcast cell processing differs significantly from the prior art steps.

First, a broadcast algorithm is performed which algorithm is detailed by FIG. 9(c), block 912. Initially, the hop count, which is preferably stored in the VCI field of broadcast messages of the present invention, is decremented, block 931. As has been discussed, the hop count may be decremented by 1 or may be decremented by some larger value in order to provide for more efficient processing. The larger value may be selected by subtracting the maximum number of "hops" from the switch to reach all other points in the network from the current hop count. In this way, unnecessary forwarding of a cell is even further reduced. Of come, it is obvious to one of ordinary skill that other alternatives such as the above-mentioned use of a timestamp in order to provide for expiration of the cell may be employed in this step in place of use of hop counts. Further, it is of course obvious that it would be possible to provide an implementation wherein the "hop count" value would start at a predetermined value k and would be added to, rather than subtracted from, at each switch. Of come, this alternative may pose some disadvantages at least in that the "maximum count" would then likely have to be set system wide, rather than allowing for the possibility of an originating node setting the hop count value to a value representative of the maximum number of switches through which a cell would have to pass to be provided to all nodes in the network.

In any event, after decrementing or otherwise examining the expiration field (e.g. the VCI field), the expiration field is checked to determine if the cell has "expired". In the preferred embodiment, this is accomplished by checking if the VCI field is equal to the predetermined value k, block 932. (It is noted that alternatives may provide for checking the hop count field, block 932, prior to decrementing the field, block 931, in which case the check would determine if the hop count field was equal to the predetermined value k+1.)

If the cell has expired, the cell is discarded, block 933. If the cell has not expired, the VPI value is used as a look-up into the translation table, block 934. As has been discussed the VPI value in the preferred embodiment is set to all 1s. The entry in the look-up table then provides forwarding information identifying each of the output ports. Copies of the cell are then forwarded on each of the output ports identified by the entry in the translation table, block 913 and the process is repeated at the next switch for each copy of the cell.

The content of the broadcast translation table which is used to provide forwarding information for broadcast messages may be better understood with reference to the below Table II and with reference to FIGS. 4. Table II illustrates the basic contents of the broadcast translation table for switch 403.

TABLE II

| Broadcast translation table for Switch 403 (Topology Independent) | |
|---|---|
| Message arrives on Port # | Transmit to Port #'s |
| 413a | 413b, 413c, 413d, 413e |
| 413b | 413a, 413c, 413d, 413e |
| 413c | 413a, 413b, 413d, 413e |
| 413d | 413a, 413b, 413c, 413e |
| 413e | 413a, 413b, 413c, 413d |

It is noted that the broadcast translation table indicates that a broadcast message received on any of the ports of switch 403 is to be output on all other ports of the switch 403. This setup, in accordance with the teachings of the present invention, is topology independent meaning that, without regard to the topology of the rest of the network, this switch 403 must only have knowledge of its own set of output ports. As has been discussed, looping in the system is avoided through use of the above-discussed "expiration" information, e.g., hop count.

INTERFACE WITH NETWORK SWITCHES NOT EMPLOYING THE PRESENT INVENTION

As has been discussed, the present invention allows topology-independent transmission of broadcast messages by "misusing" fields in the cell header. This, of course, may cause interface issues if a broadcast cell formatted in accordance with the teachings of the present invention is received by a switch which is not designed to operate in accordance with the teachings of the present invention. Therefore, it is important for the present invention to provide for methods and means for interfacing with switches which do not support the cell header format, including "misuse" of fields, as defined by the present invention.

As has been discussed, standards for ATM networks have established use of the value $0000\ 0000\ 0000\ 0010_2$ (i.e., $2_{10}$) in the VCI field to indicate the cell is a broadcast cell.

Figure 9D:
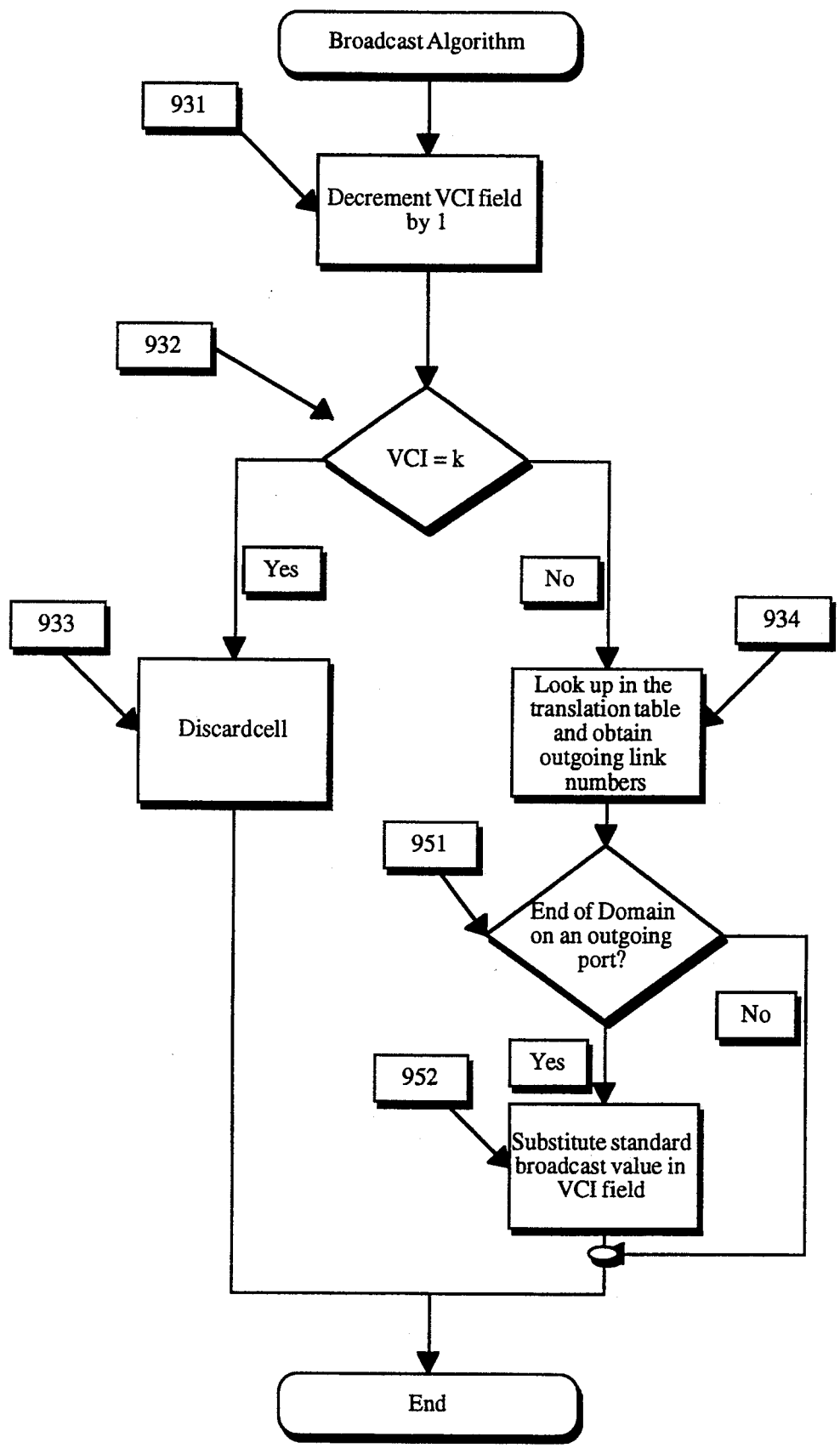

Referring to FIG. 9(d), it is noted that all switches within a single domain will either implement the present invention or will not implement the present invention. Therefore, if a cell is going to be transmitted outside of a domain which employs the present invention, block 951, the value defined by the standard (i.e., $0000\ 0000\ 0000\ 0010_2$) to indicate a message is a broadcast message is substituted into the VCI field, block 952, before forwarding.

In addition, the standard requires devices which are initially transmitting broadcast messages to transmit the messages with the value $0000\ 0000\ 0000\ 0010_2$ in the VCI field. Therefore, when a cell is received by a switch implementing the present invention which has the value $0000\ 0000\ 0000\ 0010_2$ in the VCI field, the value used by the present invention (e.g., all 1s) is substituted into the VPI field and a hop count value is placed in the VCI field. The hop count value is set by the switch to a value which equals or exceeds the maximum number of hops required to transmit the cell to all nodes in the network.

Thus, what has been disclosed is a method and apparatus which provides for topology-independent transmission of broadcast cells in an ATM network or the like.

What is claimed is:

1. A method for broadcast of cells in a network implementing Asynchronous Transfer Mode comprising the steps of:
   (a) a first station on said network formatting a cell for broadcast, said step of formatting said cell comprising the steps of:
      i) assembling a header area comprising a first area and a second area, said first area being set to a predetermined value to indicate said cell is a broadcast cell, said second area being set to contain expiration information;
      ii) assembling a third area having therein user information;
   (b) said first station transmitting said cell onto said network;
   (c) said cell being received by a fast switch;
   (d) said first switch determining if said fast area is set to said first predetermined value; and, if said fast switch is so set;
   (e) said fast switch accessing said second area to determine if said cell should be forwarded.

2. The method as recited by claim 1 wherein said fast area is a virtual path identifier, also referred to with the acronym VPI.

3. The method as recited by claim 1 wherein said predetermined value is all 1's.

4. The method as recited by claim 1 wherein said second area is a virtual channel identifier, also referred to with the acronym VCI.

5. The method as recited by claim 1 wherein said step (e) of accessing said expiration information comprises the step of decrementing said expiration information.

6. The method as recited by claim 1 wherein said step (e) of accessing said expiration information comprises the step of decrementing said expiration information by 1.

7. The method as recited by claim 1 wherein said step (e) of accessing said expiration information comprises the step of decrementing said expiration information by greater than 1.

8. The method as recited by claim 1 wherein said step (e) of accessing said expiration information comprises the step of incrementing said expiration information.

9. A network implementing Asynchronous Transfer Mode comprising:
   (a) a fast station on said network for formatting and transmitting a cell, said cell comprising:
      i) a first area being a header, said header having a first identifier field and a second identifier field, said fast identifier field set to a predetermined value to indicate said cell is a broadcast cell, said second identifier field set to a count value;
      ii) a second area having therein user information; and
   (b) a first switch for determining if said fast identifier is set to said fast predetermined value and, if said first switch is so set, for altering the count value in said second identifier field.

10. The network as recited by claim 9 wherein said first identifier field is a virtual path identifier, also referred to with the acronym VPI.

11. The network as recited by claim 9 wherein said predetermined value is all 1's.

12. The network as recited by claim 9 wherein said second identifier field is a virtual channel identifier, also referred to with the acronym VCI.

13. The network as recited by claim 9 wherein said count value is altered by decrementing said count value.

14. The network as recited by claim 9 wherein said count value is altered by decrementing said count value by 1.

15. The network as recited by 9 wherein said count value is altered by decrementing said count value by greater than 1.

16. A method for broadcast of a packet in a computer network implementing Asynchronous Transfer Mode, where said packet having a first area comprising information about said packet and a second area comprising user information, said first area having a plurality of fields including a first field and a second field, said method comprising the steps of:
   a) a first node on said network formatting said packet for broadcast, said step of
   formatting said packet for broadcast including the steps of:
      i) populating said first field with a predetermined value, and
      ii) populating said second field with a count value,
   b) said first node transmitting said packet onto said network;
   c) said packet being received by a first switch;
   d) said first switch determining if said first field is set to said predetermined value; and, if said first field is set to said predetermined value,
   e) said first switch altering said count value in said second field.

17. The method as recited by claim 16 wherein said first field is a virtual path identifier, also referred to with the acronym VPI.

18. The method as recited by claim 16 wherein said second field is a virtual channel identifier, also referred to with the acronym VCI.

19. The method as recited by claim 16 wherein said predetermined value is all 1's.

20. The method as recited by claim 16 wherein said step (e) of altering said count value comprises the step of decrementing said count value.

21. The method as recited by claim 16 wherein said step (e) of altering said count value comprises the step of decrementing said count value by 1.

22. The method as recited by claim 16 wherein said step (e) of altering said count value comprises the step of decrementing said count value by greater than 1.

23. A computer network implementing Asynchronous Transfer Mode providing for broadcast of a packet, where said packet having a first area comprising information about said packet and a second area comprising user information, said first area having a plurality of fields including a first field and a second field, said computer network comprising:
  a) a first node on said network for formatting a packet for broadcast by:
    i) populating said first field with a predetermined value, and
    ii) populating said second field with a count value,
  b) said first node transmitting said packet onto said network;
  c) a first switch for receiving said packet;
  d) said first switch determining if said first field is set to said predetermined value; and, if said first field is set to said predetermined value and,
  e) said first switch altering said count value in said second field.

24. The computer network as recited by claim 23 wherein said first field is as a virtual path identifier, also referred to with the acronym VPI.

25. The computer network as recited by claim 23 wherein said second field is a virtual channel identifier, also referred to with the acronym VCI.

26. The computer network as recited by claim 23 wherein said predetermined value is all 1's.

27. The computer network as recited by claim 23 wherein said said first switch alters said count value by decrementing said count value.

28. The computer network as recited by claim 23 wherein said said first switch alters said count value by decrementing said count value by 1.

29. The computer network as recited by claim 23 wherein said said first switch alters said count value by decrementing said count value by greater than 1.

30. A method for avoiding continuous forwarding of cells in a network implementing Asynchronous Transfer Mode comprising the steps of:
  (a) a first station on said network formatting a cell for broadcast, said step of formatting said cell comprising the steps of:
    i) assembling a header area comprising a first area and a second area, said first area being set to a predetermined value to indicate said cell is a broadcast cell, said second area being set to a count value;
    ii) assembling a third area having therein user information;
  (b) said first station transmitting said cell onto said network;
  (c) said cell being received by a first switch;
  (d) said first switch determining if said first area is set to said predetermined value; and, if said first switch is so set;
  (e) said first switch altering the count value in said second area.

31. The method as recited by claim 30 wherein said Fast area is a virtual path identifier, also referred to with the acronym VPI.

32. The method as recited by claim 30 wherein said predetermined value is all 1's.

33. The method as recited by claim 30 wherein said second area is a virtual channel identifier, also referred to with the acronym VCI.

34. The method as recited by claim 30 wherein said step (e) of altering said count value comprises the step of decrementing said count value.

35. A computer network implementing Asynchronous Transfer Mode providing for broadcast of a cell, where said cell having a first area comprising information about said cell and a second area comprising user information, said first area having a plurality of fields including a first field for storing first information and a second field for storing second information, said computer network comprising:
  a) a first node on said network for formatting a cell for broadcast by:
    i) populating said first field with a first predetermined value, said first predetermined value representing said cell is a broadcast cell; and
    ii) populating said second field with a second predetermined value, said second predetermined value further representing said cell is a broadcast cell;
  b) said first node transmitting said cell onto said network;
  c) a first switch for receiving said cell;
  d) said first switch determining if said first field is set to said first predetermined value and if said second field is set to said second predetermined value; and, if so set,
  e) said first switch further altering said second field to contain a count value.

36. The computer network as recited by claim 35 wherein said first field is as a virtual path identifier, also referred to with the acronym VPI and said first predetermined value is 0.

37. The computer network as recited by claim 35 wherein said second field is a virtual channel identifier, also referred to with the acronym VCI, and said second predetermined value is 2.

38. The computer network as recited by claim 35 further comprising the step of altering said first field after step (e).

39. The computer network as recited by claim 38 wherein said first field is altered to contain all 1's.

* * * * *